(12) United States Patent
Palin et al.

(10) Patent No.: US 11,601,546 B2
(45) Date of Patent: Mar. 7, 2023

(54) EVENT NOTIFICATION

(71) Applicant: NOKIA TECHNOLOGIES OY, Espoo (FI)

(72) Inventors: Arto Palin, Akaa (FI); Jukka Pekka Reunamaki, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/636,350

(22) PCT Filed: Aug. 2, 2018

(86) PCT No.: PCT/EP2018/070983
§ 371 (c)(1),
(2) Date: Feb. 4, 2020

(87) PCT Pub. No.: WO2019/025534
PCT Pub. Date: Feb. 7, 2019

(65) Prior Publication Data
US 2020/0169633 A1    May 28, 2020

(30) Foreign Application Priority Data

Aug. 4, 2017  (EP) .................................. 17184887

(51) Int. Cl.
*H04M 1/72484* (2021.01)
*H04W 68/00* (2009.01)
(Continued)

(52) U.S. Cl.
CPC ..... *H04M 1/72484* (2021.01); *H04M 1/6066* (2013.01); *H04M 1/72412* (2021.01);
(Continued)

(58) Field of Classification Search
CPC ..... H04W 4/80; H04W 8/005; H04W 68/005; H04M 1/6066; H04M 1/72597
See application file for complete search history.

(56) References Cited

U.S. PATENT DOCUMENTS 9,172,792 B2   10/2015   Lin
9,219,826 B2   12/2015   Sweeney et al.
(Continued)

FOREIGN PATENT DOCUMENTS

CN   104243684 A   12/2014
CN   105897311 A    8/2016
(Continued)

OTHER PUBLICATIONS

Office Action for European Application No. 17 184 887.2 dated May 7, 2020, 4 pages.
(Continued)

*Primary Examiner* — Jinsong Hu
*Assistant Examiner* — Farideh Madani
(74) *Attorney, Agent, or Firm* — Alston & Bird LLP (57) ABSTRACT

According to an example aspect of the present invention, there is provided an apparatus comprising at least one processing core, at least one memory including computer program code, the at least one memory and the computer program code being configured to, with the at least one processing core, cause the apparatus at least to provide to a storage entity information relating to pairing an accessory with the apparatus, and determine an event and at least partly responsive to the event, notify the storage entity, the apparatus and/or the accessory of the event.

21 Claims, 9 Drawing Sheets

(51) Int. Cl.
  *H04W 4/80* (2018.01)
  *H04M 1/60* (2006.01)
  *H04W 8/00* (2009.01)
  *H04M 1/72412* (2021.01)

(52) U.S. Cl.
  CPC ............ *H04W 4/80* (2018.02); *H04W 8/005* (2013.01); *H04W 68/005* (2013.01)

(56) References Cited

U.S. PATENT DOCUMENTS

| | | | |
|---|---|---|---|
| 9,392,523 B1* | 7/2016 | Arestani | H04L 65/4015 |
| 9,668,044 B2 | 5/2017 | Schobel et al. | |
| 2007/0281762 A1* | 12/2007 | Barros | H04M 1/6066 |
| | | | 455/575.6 |
| 2014/0370864 A1* | 12/2014 | Lin | H04M 3/20 |
| | | | 455/415 |
| 2015/0351142 A1 | 12/2015 | Seymour et al. | |
| 2016/0164973 A1* | 6/2016 | Kapoor | H04R 3/12 |
| | | | 709/208 |
| 2016/0234366 A1* | 8/2016 | De Filippis | H04L 51/043 |
| 2016/0360031 A1 | 12/2016 | Rauebbuehler et al. | |
| 2016/0360341 A1* | 12/2016 | Srivatsa | H04L 67/104 |
| 2017/0072329 A1 | 3/2017 | Akavia et al. | |
| 2017/0078786 A1 | 3/2017 | Schobel et al. | |
| 2017/0223163 A1* | 8/2017 | Li | H04M 3/537 |

FOREIGN PATENT DOCUMENTS

| | | | |
|---|---|---|---|
| CN | 106465442 A | 2/2017 | |
| WO | WO 2015/144981 A1 | 10/2015 | |
| WO | WO-2015144981 A1 * | 10/2015 | .......... H04M 1/7253 |
| WO | WO 2016/172457 A1 | 10/2016 | |

OTHER PUBLICATIONS

Extended European Search Report for Application No. 17184887.2 dated Jan. 17, 2018, 12 pages.

International Search Report and Written Opinion for Application No. PCT/EP2018/070983 dated Sep. 27, 2018, 19 pages.

Office Action for Chinese Patent Application No. 201880064151.X dated Dec. 14, 2020, with English translation, 19 pages.

Office Action for Chinese Application No. 201880064151X dated Sep. 2, 2021, 18 pages.

* cited by examiner

EVENT NOTIFICATION

CROSS-REFERENCE TO RELATED APPLICATIONS

This application is a national phase entry of International Application No. PCT/EP2018/070983, filed Aug. 2, 2018, which claims priority to European Patent Application No. 17184887.2, filed Aug. 4, 2017, the entire contents of which are incorporated herein by reference.

FIELD

The present invention relates to management of notifications that relate to events, such as communication events or alarms.

BACKGROUND

User devices may be used with accessories, which may be engineered to enhance a utility a user may obtain from the user device, for example, headphones or ear plugs may be used with a cellular telephone to enable the user to use the telephone while jogging, driving a car or when otherwise unable or willing to hold the telephone to the user's ear.

SUMMARY OF THE INVENTION

According to some aspects, there is provided the subject-matter of the independent claims. Some embodiments are defined in the dependent claims.

According to a first aspect of the present invention, there is provided an apparatus comprising at least one processing core, at least one memory including computer program code, the at least one memory and the computer program code being configured to, with the at least one processing core, cause the apparatus at least to provide to a storage entity information relating to use of an accessory with the apparatus, and determine an event and at least partly responsive to the event, notify the storage entity, the apparatus and/or the accessory of the event.

Various embodiments of the first aspect may comprise at least one feature from the following bulleted list:
- the at least one memory and the computer program code are configured to, with the at least one processing core, cause the apparatus to determine whether the accessory is of a first type, and to notify the storage entity if the accessory is of the first type
- the event comprises an incoming call and the accessory comprises at least one of the following: headphones, ear plugs and a virtual reality headset
- the at least one memory and the computer program code are configured to, with the at least one processing core, cause the apparatus to query from the storage entity, whether the accessory or an another accessory is in use with a second apparatus, and to notify the storage entity if the accessory or the another accessory is in use with the second apparatus
- the at least one memory and the computer program code are configured to, with the at least one processing core, cause the apparatus to notify the storage entity of at least one characteristic of the event.

The information relating to use of the accessory with the apparatus may comprise information relating to pairing of the accessory with the apparatus.

According to a second aspect of the present invention, there is provided an apparatus comprising at least one processing core, at least one memory including computer program code, the at least one memory and the computer program code being configured to, with the at least one processing core, cause the apparatus at least to notify a storage entity that the apparatus is using an accessory, receive from the storage entity an indication of an event relating to a second apparatus, and provide a sensory indication of the event via the apparatus, the accessory, or a combination thereof.

Various embodiments of the first aspect may comprise at least one feature from the following bulleted list;
- the at least one memory and the computer program code are configured to, with the at least one processing core, cause the apparatus to provide at least one characteristic of the event via the accessory
- the event comprises an incoming call and the accessory comprises at least one of the following: headphones, ear plugs and a virtual reality headset
- the at least one memory and the computer program code are configured to, with the at least one processing core, cause the apparatus to provide contents of the event via the accessory, the contents being routed to the apparatus from the second apparatus.

According to a third aspect of the present invention, there is provided a method comprising providing to a storage entity information relating to use of an accessory with an apparatus performing the method, and determining an event and at least partly responsive to the event, notifying the storage entity, the apparatus and/or the accessory of the event.

Various embodiments of the third aspect may comprise at least one feature from the following bulleted list:
- determining whether the accessory is of a first type, and notifying the storage entity if the accessory is of the first type
- querying from the storage entity, whether the accessory or another accessory is in use with a second apparatus, and notifying the storage entity if the accessory or the another accessory is in use with the second apparatus.

According to a fourth aspect of the present invention, there is provided a method comprising notifying a storage entity that an apparatus performing the method is using an accessory, receiving from the storage entity an indication of an event relating to a second apparatus, and providing a sensory indication of the event via the apparatus, the accessory, or a combination thereof.

According to a fifth aspect of the present invention, there is provided a method, comprising receiving, from a first apparatus, information relating to pairing an accessory with the first apparatus and receiving, from a second apparatus, an indication the second apparatus is using the accessory, receiving from the first apparatus a notification of an event relating to the first apparatus, and notifying the second apparatus the accessory, or a combination thereof of the event.

According to a sixth aspect of the present invention, there is provided a computer program configured to cause a method in accordance with at least one of the third, fourth and fifth aspects to be performed.

According to a seventh aspect of the present invention, there is provided an apparatus comprising means for providing to a storage entity information relating to use of an accessory with the apparatus, and means for determining an event and at least partly responsive to the event, notifying the storage entity, the apparatus and/or the accessory of the event.

According to an eighth aspect of the present invention, there is provided an apparatus comprising means for notifying a storage entity that the apparatus is using an accessory, means for receiving from the storage entity an indication of an event relating to a second apparatus, and means for providing a sensory indication of the event via the apparatus, the accessory, or a combination thereof.

According to a ninth aspect of the present invention, there is provided a non-transitory computer readable medium having stored thereon a set of computer readable instructions that, when executed by at least one processor, cause an apparatus to at least provide to a storage entity information relating to use of an accessory with the apparatus, and determine an event and at least partly responsive to the event, notify the storage entity, the apparatus and/or the accessory of the event.

According to a tenth aspect of the present invention, there is provided a non-transitory computer readable medium having stored thereon a set of computer readable instructions that, when executed by at least one processor, cause an apparatus to at least notify a storage entity that the apparatus is using an accessory, receive from the storage entity an indication of an event relating to a second apparatus, and provide a sensory indication of the event via the apparatus, the accessory, or a combination thereof.

According to an eleventh aspect of the present invention, there is provided a non-transitory computer readable medium having stored thereon a set of computer readable instructions that, when executed by at least one processor, cause an apparatus to at least receive, from a first apparatus, information relating to pairing an accessory with the first apparatus and receiving, from a second apparatus, an indication the second apparatus is using the accessory, receive from the first apparatus a notification of an event relating to the first apparatus, and notify the second apparatus, the accessory, or a combination thereof of the event.

EMBODIMENTS

The present invention is directed to conveying notifications via accessories that are not in use with the device determining an event that triggers the notifications. For example, a device may have previously been paired with an accessory capable of conveying a notification, but the accessory may, when the event occurs, be in use with a different, second, device. The devices may be correlated with each other via a storage entity, such as, for example, a cloud storage storing a subscription or account. The device determining the event may send a notification to the storage entity, which may be capable of notifying the second device. The second device may, in turn, notify the user via the accessory.

The inventor has realised that certain aspects of communication and operation may be improved upon. To this effect, the following describes several aspects and embodiments, which may be implemented in isolation or in combination with each other, for achieving the advantages described hereunder.

Accessories in general cover a wide range of devices designed for different purposes, for example, a detachable lens mechanism may enhance optical performance of a user camera, a virtual reality headset may enable virtual immersion of a surgeon into a blood vessel of a patient, based on image data obtained from a video sensor inserted in the blood vessel.

To enable interoperation of generic accessories with devices produced by a diverse set of manufacturers, industry standards have been developed. Such standards may define physical and/or operational characteristics of accessories that are to be capable of interoperation in accordance with these standards. For example, a standard headphone connection may define a 3.5 millimetre physical connector, as well as electrical characteristics of an audio signal that is to be provided via the physical connector. Other type connectors exist too.

Certain accessories enable notification of a user concerning an event. For example, when a user listens to a radio broadcast with headphones, the headphones may relay information concerning an incoming telephone call, in case the software radio is comprised in a cellular telephone apparatus. The user may handle the incoming call, and then return to the software radio broadcast, without removing his headphones. Likewise a user driving a car may receive and even initiate telephone calls or social media updates using a hands-free accessory, which may be voice-directed, for example, without letting go of the steering wheel.

Figure 1:
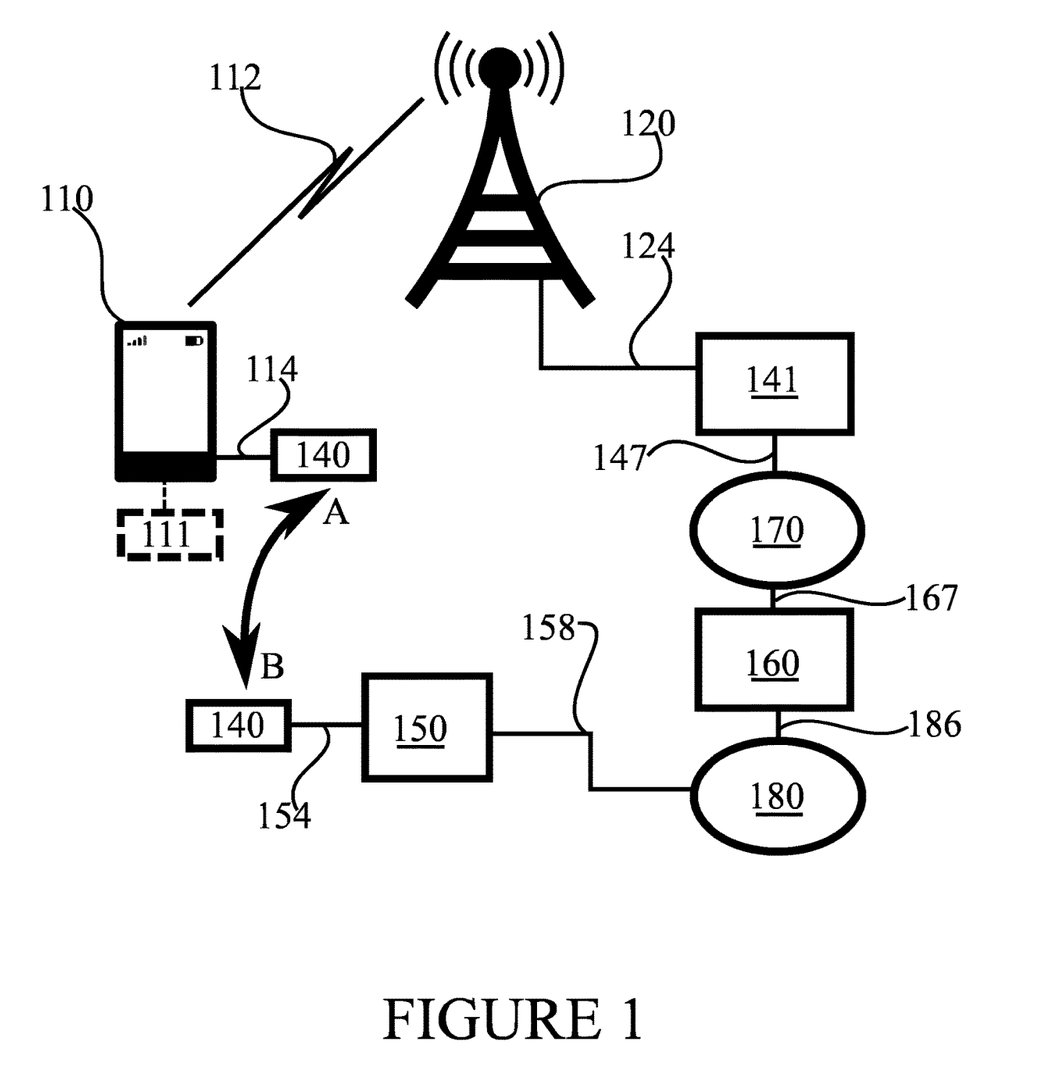
FIG. 1 illustrates an example system in accordance with at least some embodiments.

FIG. 1 illustrates an example system in accordance with at least some embodiments. Device 110, which may comprise, for example, a user device, user equipment, mobile phone, smartphone, tablet device, laptop computer, desktop computer or another suitable device, may be in wireless communication with base station 120.

In some embodiments the user may have different devices registered as his own devices like one or more smart phones, laptops or tablets. The user may have a control or a limited control of some other smart phones, laptops or tablets or some other electronic devices which are registered in different accounts.

To achieve interoperability, mobile 110 and base station 120 may be configured to operate in accordance with a same communication technology, such as, for example, a cellular or non-cellular technology. Examples of cellular communication technologies include wideband code division multiple access, WCDMA, long term evolution, LTE, and fifth generation, 5G, also known as new radio, NR. Examples of non-cellular communication technologies include wireless local area network, WLAN, and worldwide interoperability for microwave access, WiMAX, technologies. However, in some embodiments, the base station may also operate under different radio access technologies, RATs, such as LTE and 5G.

Radio link 112 connects device 110 with base station 120. Radio link 112 may be arranged in accordance with a same communication technology as device 110 and base station 120, to achieve interoperability. As said, base station 120, as well as device 110, may be capable of communicating also with other communication technologies. The expression "base station" is a terminological choice by which it is not intended to limit the present disclosure to any specific technology. Depending on a communication technology used, the expression "access point" may be used alternatively to "base station". The expression "access node" may comprise either a base station or an access point. Base station 120 may be a virtual base station, or function as a virtual base station.

Base station 120 is operably connected, via connection 124, with network node 141, which may comprise, for example, a mobility management entity, MME, switch or base station controller. Network node 141 may communicate with further networks via connection 147, an example of such a network being provided in the system of FIG. 1 as network 170.

Although described herein in connection with FIG. 1 as a wirelessly connected device, in general device 110 may comprise, for example, a desktop computer with a wire-line Ethernet connection to the Internet. Such a desktop computer may receive, for example, incoming internet protocol telephony calls as events.

Accessory 140 may be, in the system of FIG. 1, in one of two positions, A or B. In position A, accessory 140 is in use with device 110 via connection 114, and in position B, it is in use with unit 150 via connection 154. Accessory 140 may comprise, for example, a headset, earplugs or a virtual reality headset. A headset, and likewise earplugs, is usable in emitting sound to the user's ear or ears, such that the user may listen to music, for example, without disturbing persons around him. A virtual reality headset enables at least partial immersion in a virtual landscape by providing a visual experience of being in the virtual landscape. A virtual reality headset may comprise an audio headset. A common factor in these three kinds of accessory is that they decrease the user's concentration in audio cues present in his surroundings. The virtual reality headset decreases the user's concentration also concerning visual cues, since the virtual landscape provided thereby obscures the real surroundings of the user. Connection 114 between accessory 140 and device 110 may comprise an electrically conductive wire or a low-power wireless connection, such as Bluetooth, BLE, or corresponding technologies, for example.

The system of FIG. 1 further comprises a storage entity 160. Storage entity 160 may comprise, for example, a cloud storage or cloud server farm configured to store account or subscription information. For example, a service provider providing or coordinating a device ecosystem may gather information on devices in use by a specific user, to facilitate access to a cloud data storage directory from different devices of the user, for example. A subscription account may be physically at storage entity 160, for example. Transmitting information to storage entity 160 may thus comprise transmitting information for storage in the account of the user, the account comprising information of devices the user has in use. Storage entity 160 may communicate with device 110 via connection 167 and network 170, and storage entity 160 may communicate with unit 150 via connection 186, network 180 and connection 158. Networks 170 and 180 may be optional, they may be the same network and/or storage entity 160 may be disposed in at least one of these networks.

When in use with device 110, accessory 140 may be used by device 110 to notify the user concerning an event of device 110, such as an incoming telephone call or social media update, for example. A further example of an event is a carbon monoxide alarm, in embodiments where device 110 is interfaced with an optional carbon monoxide sensor 111. In general, the event may be determined in device 110 independently of other network nodes, as in the case of carbon monoxide or carbon dioxide level alarm, or the event may be determined in device 110 responsive to a signal received in device 110 from another network node, for example network node 141, as in the case of an incoming call.

When in use with unit 150, accessory 140 may be used to provide sensory inputs relating to operating unit 150, which may comprise, for example, a gaming console or radio. Connection 154 between accessory 140 and unit 150 may comprise an electrically conductive wire or a wireless connection, such as Bluetooth, BLE, for example.

When initially paired with device 110, accessory 140 may participate, together with device 110, in generation of pairing information. Pairing information may comprise identifiers of paired devices and, optionally, encryption keys used, such that when the devices are subsequently used together, the initial pairing process need not be repeated, which facilitates using the accessory. Alternatively, device 110 may simply inform storage entity 160 that accessory 140 is paired or in use with device 110.

Device 110 may provide the pairing information to storage entity 160, which may store it in connection with an account of the user. When the user later uses accessory 140 with unit 150, the pairing information may be retrieved from storage entity 160, for example, to facilitate taking accessory 140 into use with unit 150. Unit 150 may inform storage entity 160 that accessory 140 is being used with unit 150, when accessory 140 is being used with unit 150.

As accessory 140 is used with unit 150, the user may have a reduced concentration to receiving notifications from device 110. For example, an audible alarm from device 110 may be difficult to hear over a sound level produced by earplugs used with unit 150. Thus the user may miss events that are notified by device 110.

Device 110 may be configured to notify storage entity 160 of an event in device 110. Storage entity 160 may, responsive to the notification from device 110, determine whether an accessory 140 is in use with another device than device 110, and responsive to a determination in storage entity 160 that accessory 140 is in use with unit 150, storage entity 160 may notify unit 150 concerning the event in device 110.

The notifications from device 110 and from storage entity 160 may comprise information concerning the event, for example, at least one characteristic of the event. Such a characteristic may comprise an event type and/or data concerning the event. For example, the characteristics may comprise an event type "Alarm" and associated data "carbon monoxide". Another example is an event type "Incoming call", which may be accompanied by a caller-ID of the calling party, and/or a picture of the face of the caller.

Unit 150 may be configured to notify the user, via accessory 140, responsive to the notification from storage entity 160. For example, in case of carbon monoxide alarm, an alarm sound may be played, accompanied by a spoken notification "Carbon monoxide danger". As another example, a spoken notification "Your phone is ringing, Joe is calling" may be provided. As a yet further example, an e-mail message incoming in an email account associated with device 110 may be notified using a same audio signal as device 110 uses to notify an incoming e-mail.

In some embodiments, device 110 is configured to query, for example responsive to determining the event, from storage entity 160, whether accessory 140, or more generally any accessory, is in use. Device 110 may then be configured to notify storage entity 160 responsive to an indication from storage entity 160 that an accessory is indeed in use.

In some embodiments storage entity 160 may have a status information of the accessory 140, for example in the form "in use" or "free". In other embodiments storage entity 160 may have also information that accessory 140 is in use with unit 150. In yet further embodiments the storage entity 160 can have information about the time stamp of last used of accessory 140 and by which device, such as, for example, unit 150, used at that time. That might help user to find accessory faster. That information can be shown in connection with a call to or from device 140 or by a request of the device 140 as a way of notification, icon or so.

In some, embodiments, device 110 will refrain from notifying storage entity 160 of the event in case device 110 has not been paired with an accessory of a first type in the past. In other embodiments, device 110 is configured to attempt to find out, if an accessory of the first type is in use with another device of the user regardless of whether one has been in use with device 110 before.

The first type may comprise a type which decreases a user's concentration in audio and/or video cues present in his surroundings, for example. Accessories may comprise, in an identifying data field, an indication as to whether they are accessories of the first type. This indication may be provided to device 110 and/or unit 150 when the accessory is taken into use with them. The indication may be provided onward to storage entity 160 in connection with informing the storage entity the accessory is in use, to enable the storage entity to advise other devices that an accessory of the first type is in use, and/or in deciding whether to provide a notification to a specific device. In detail, the storage entity may be configured to decide to notify a device that is using an accessory of the first type.

In some of these embodiments, device 110 will refrain from notifying storage entity 160 of the event in case device 110 is currently using the accessory of the first type with which it has been paired.

In some embodiments, device 110 is configured to query, for example responsive to determining the event, from storage entity 160, whether an accessory of the first type is in use by the user, and to notify storage entity 160 of the event responsive to being informed that an accessory of the first type is in use by the user. Thus the accessory that is in use need not necessarily be one that has been paired with device 110 in the past.

In some embodiments, device 110 is configured to notify storage entity 160 without querying from storage entity 160 responsive to the event. For example, device 110 may notify storage entity 160 simply responsive to the event occurring at a time when the user is not using an accessory of the first type with device 110 itself.

Once storage entity 160 has been notified by device 110, it may decide on a further apparatus, such as unit 150, to notify. In detail, storage entity 160 may decide to notify a further apparatus that is using an accessory, for example an accessory of the first type. In case storage entity 160 cannot determine any suitable apparatus to notify, it may discard the notification it has received from device 110.

Device 110 may be configured to provide contents of the event to unit 150, via storage entity 160 or by otherwise routing it. For example, storage entity 160 may, in addition to notifying unit 150 of the event, advise device 110 concerning an internet protocol address of unit 150 to enable device 110 to forward contents of the event to unit 150. The internet protocol address may comprise an IPv4 or IPv6 address, for example. In detail, where the event is an incoming call, device 110 and unit 150 may be configured to route the call to unit 150, such that accessory 140 is used with unit 150 to convey the call.

Figure 2:
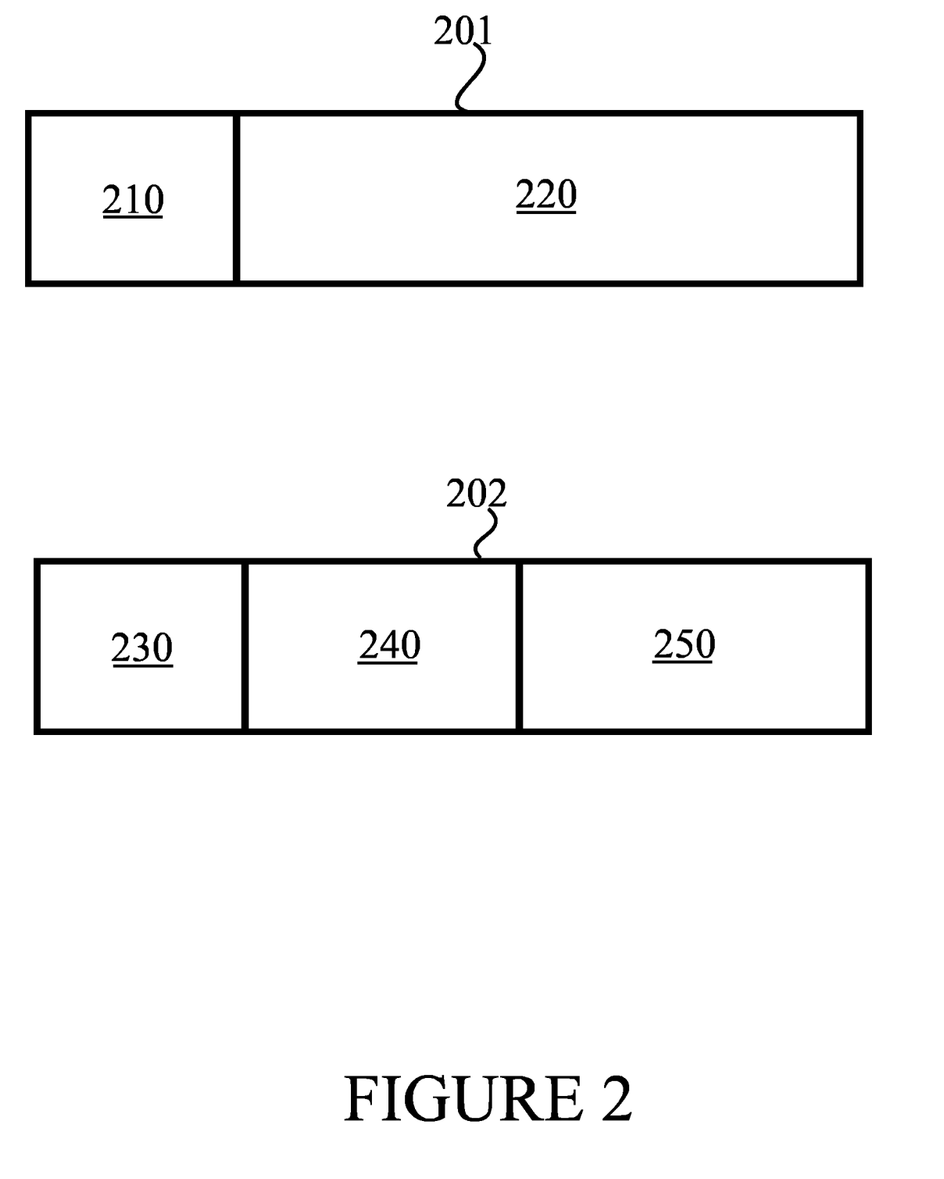
FIG. 2 illustrates example notifications.

FIG. 2 illustrates example notifications. The notifications may be transmitted from device 110 of FIG. 1, for example. In some embodiments, storage entity 160 forwards the notifications it receives from device 110 to unit 150, or in general to an apparatus that is using an accessory, such as, for example, an accessory of the first type. Notification 201 comprises two characteristics, event type 210 and event information 220. As described above, the event type may comprise an incoming call and event information may comprise a caller identity.

Notification 202 comprises three characteristics, event type 230, event information 240 and a media part 250. Event type 230 may be similar to event type 210 and event information 240 may be similar to event information 220. Media part 250 may comprise, for example, a media file, such as audio clip, the user of device 110 has selected for notifying an event of event type 230. This enables the user to be notified of an incoming e-mail, for example, with the same chime as usually, from device 110. Alternatively, in case the user is of impaired hearing and has configured device 110 to notify himself with a visual flash, unit 150 may provide the same visual flash, enabling successful notification. Media part 250 may comprise information describing the visual flash. Media part 250 may comprise an image of the face of the caller associated with a caller ID. In one embodiment, media part 250 may comprise an Internet address. In some embodiments media part 250 may comprise a request to open a chat or messaging window.

Storage entity 160 may comprise plural accounts of users. The users may be linked to send messages or video calls through one or more applications in devices 110, or units 150, when connected to a suitable communication network. Thus, for example, in case of incoming call which is notified by storage entity 160, the storage entity may start an application for communication between users, that is, between a caller and a called person.

In some embodiments storage entity 160 may work together with other entities which are administrated by other entity owners. In one embodiment the interface between different storage entities may be interoperable to facilitate communication, for example, to exchange relevant user information.

Figure 3:
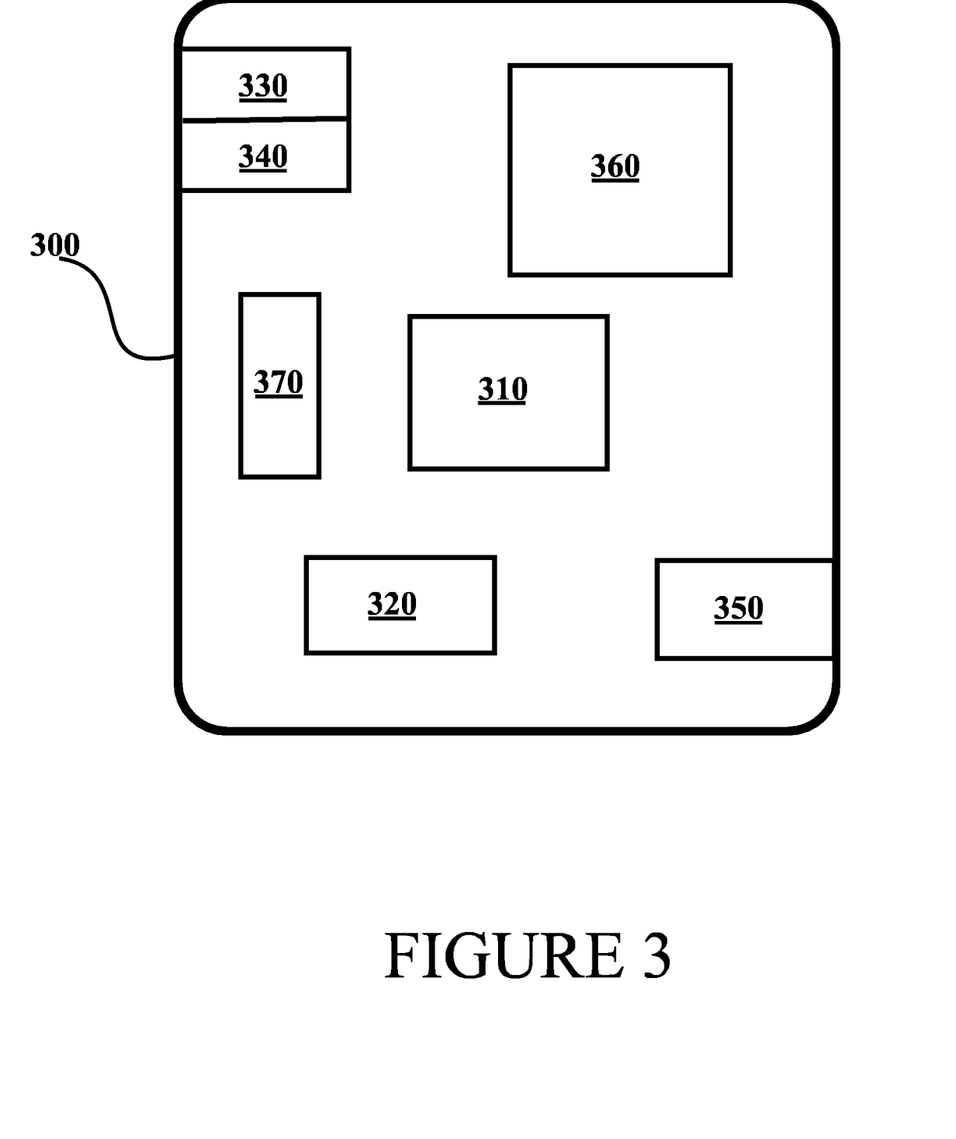
FIG. 3 illustrates an example apparatus capable of supporting at least some embodiments.

FIG. 3 illustrates an example apparatus capable of supporting at least some embodiments. Illustrated is device 300, which may comprise, for example, device 110, unit 150 or, in suitable parts, a server of storage entity 160 of FIG. 1. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 300 may comprise a local and/or near-field communication, NFC, transceiver 350. Transceiver 350 may support at least one technology, such as NFC, Bluetooth, Bluetooth Low Energy or similar technologies. Device 300 may comprise more than one transceiver.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via transceiver 350, and/or to play games. In one embodiment the user can be provided a notification regarding an incoming call or communication connection in the user interface, and the user may be provided a selectable option to accept or reject the call, and/or to initiate a request to change to another communication connection in the user interface.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a transceiver 350 and/or user identity module 370.

Processor 310, memory 320, transmitter 330, receiver 340, transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
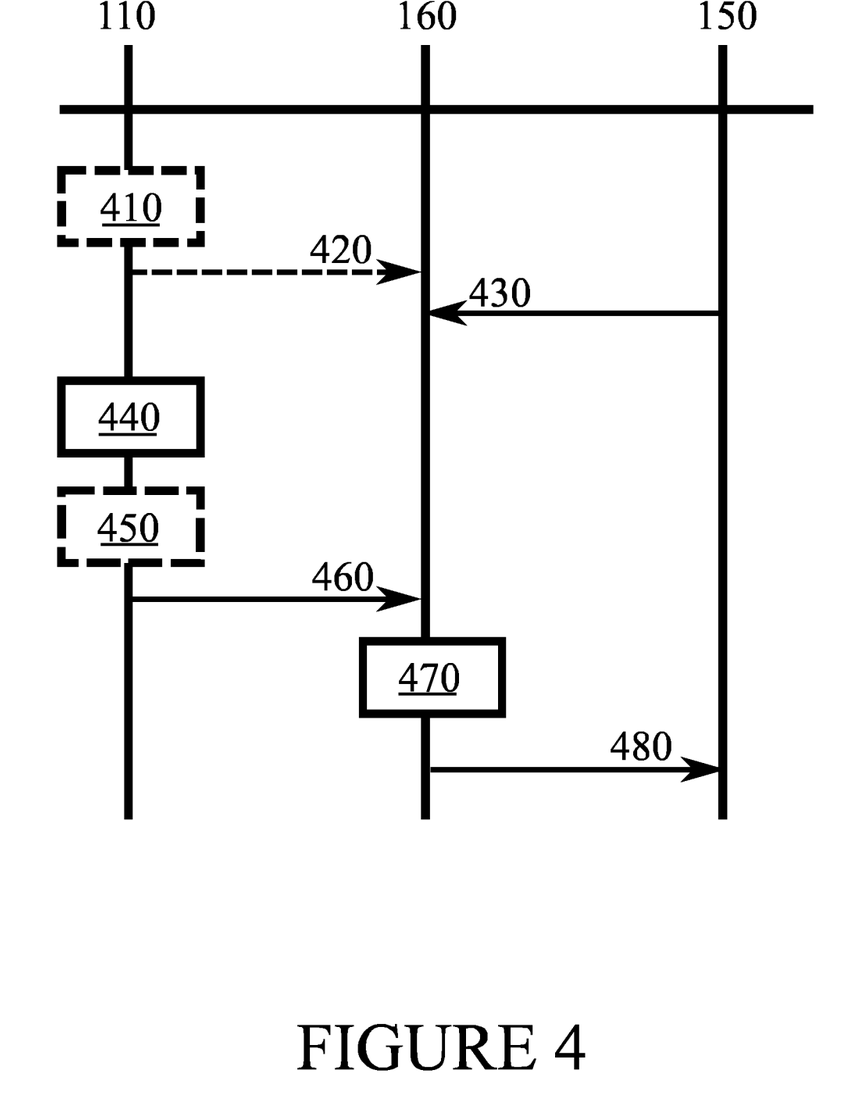
FIG. 4 illustrates signalling in accordance with at least some embodiments.

FIG. 4 illustrates signalling in accordance with at least some embodiments. On the vertical axes are disposed, on the left, device 110, in the centre, storage entity 160 and on the right, unit 150, each of FIG. 1. Time advances from the top toward the bottom.

In phase 410, a pairing of device 110 with an accessory is performed, generating pairing information. The accessory may be of the first type, for example. Device 110 provides the pairing information to storage entity 160 in phase 420. Phases 410 and 420 are optional. In phase 430, unit 150 informs storage entity 160 it is using an accessory of the first type, which may be the same one as was paired with device 110 in phase 410, or a different one.

In phase 440, device 110 determines an event that triggers notification. Device 110 may determine the need for notification of the event from user preferences configured in device 110, in storage entity 160, or in both, for example. User preferences may determine which types of event are notified. In optional phase 450, device 110 may determine whether to attempt notification via storage entity 160. For example, phase 450 may comprise device 110 querying from storage entity 160, whether another device associated with the user is using an accessory of the first type, and in case this is the case, phase 450 may comprise deciding to attempt notification via storage entity 160.

Phase 460 comprises notifying, by device 110, storage entity 160 concerning the event. The notification may comprise characteristics as laid out above in connection with FIG. 2, for example. Phase 470 may comprise storage entity 160 deciding whether to act on the notification of phase 460, and if so, which device to notify. Based on the information received in storage entity 160 in phase 430, it may be decided to notify unit 150. Unit 150 is notified in phase 480.

Figure 5:
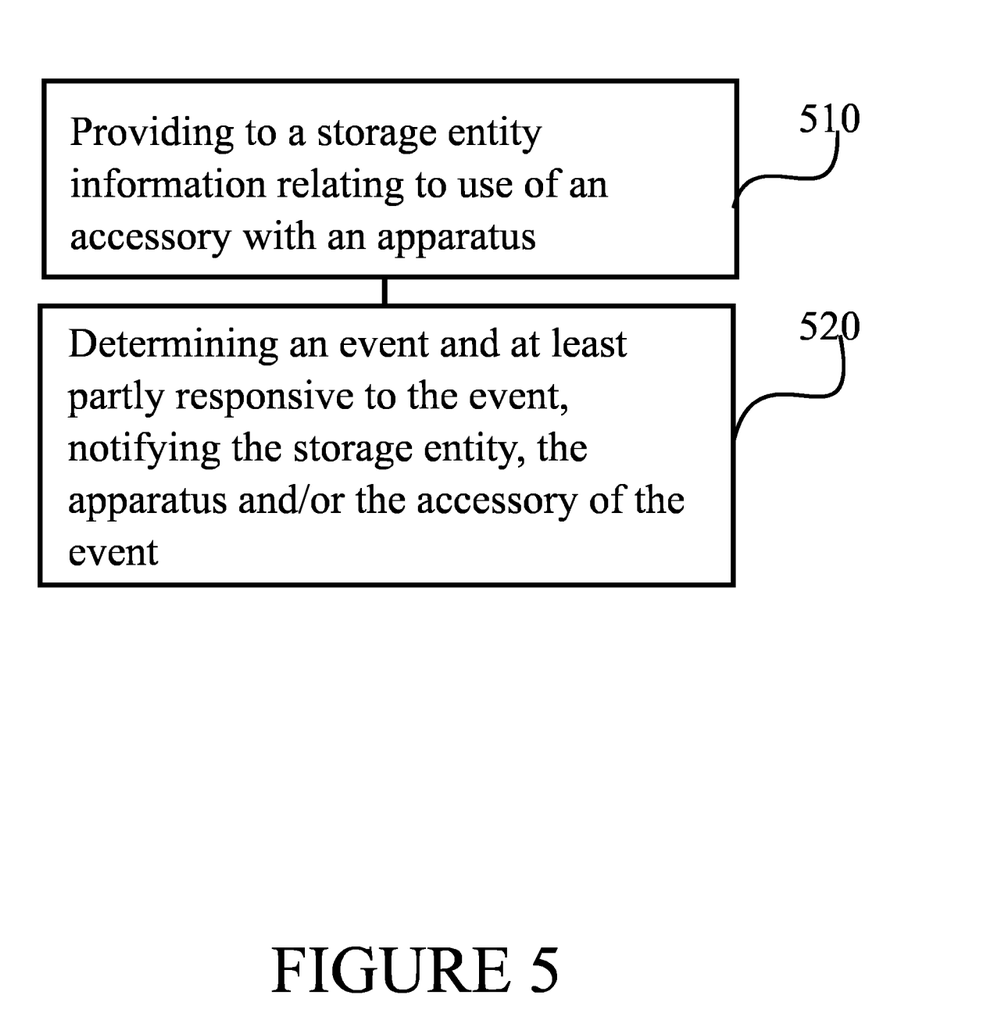
FIGS. 5-7 are flow graphs of methods in accordance with at least some embodiments.

FIG. 5 is a flow graph of a method in accordance with at least some embodiments of the present invention. The phases of the illustrated method may be performed in device 110, for example, or in a control device configured to control the functioning thereof, when installed therein.

Phase 510 comprises providing to a storage entity information relating to use of an accessory with an apparatus performing the method. The information relating to use of the accessory with the apparatus may comprise information relating to pairing of the accessory with the apparatus, for example. Phase 520 comprises determining an event and at least partly responsive to the event, notifying the storage entity the apparatus and/or the accessory of the event. Pairing information may comprise identifiers of the accessory and the apparatus and, optionally, encryption keys used in the pairing. The event may comprise a communication event, such as, for example, an incoming call. Alternatively, the event may comprise an alarm. An alarm may relate to, for example, carbon monoxide or smoke. The storage entity may comprise a cloud computing entity, for example. Notifying may comprise transmitting a notification which comprises at least one characteristic of the event.

Figure 6:
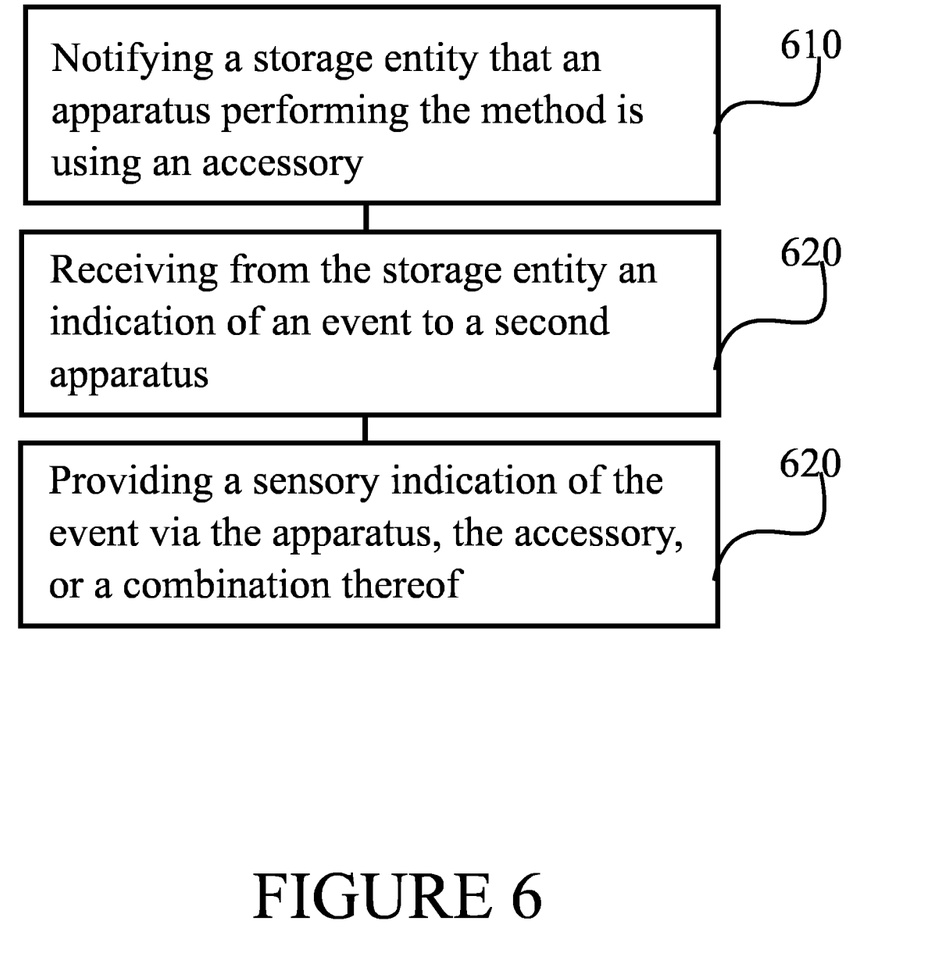

FIG. 6 is a flow graph of a method in accordance with at least some embodiments. The phases of the illustrated method may be performed in unit 150, for example, or in a control device configured to control the functioning thereof, when installed therein.

Phase 610 comprises notifying a storage entity that an apparatus performing the method is using an accessory. Phase 620 comprises receiving from the storage entity an indication of an event relating to a second apparatus. Finally, phase 630 comprises providing a sensory indication of the event via the apparatus, the accessory, or a combination thereof.

In some embodiments, after the event notification has reached a current device using the accessory apparatus, a connection between the current device using the accessory apparatus is stopped and/or the presentation of a current presentation is stopped. A connection between the accessory and the second apparatus may be established. This might facilitate avoiding a missed call. After the call has been finished, the operation with the apparatus may continue as it was before the event.

Figure 7:
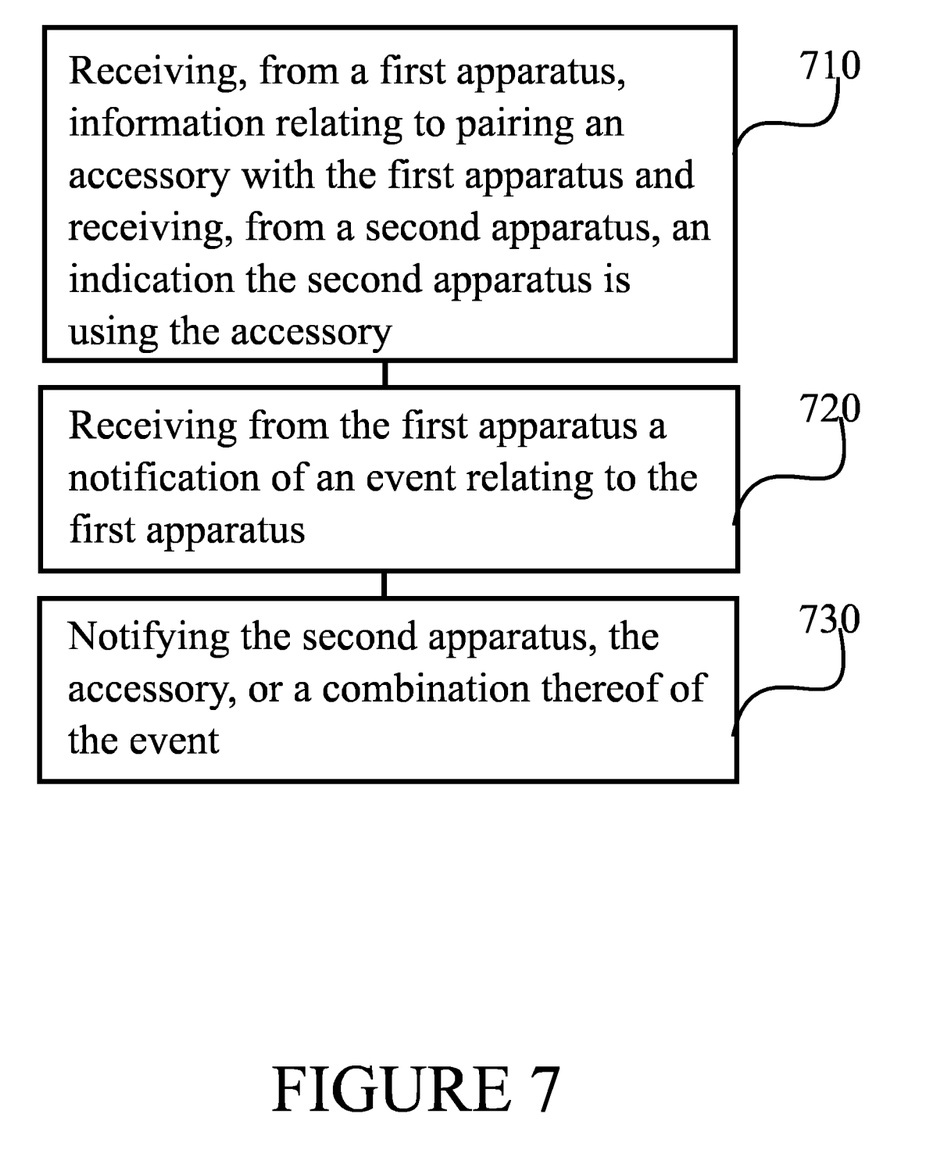

FIG. 7 is a flow graph of a method in accordance with at least some embodiments. The phases of the illustrated method may be performed in storage entity, for example, or in a control device configured to control the functioning thereof, when installed therein.

Phase 710 comprises receiving, from a first apparatus, information relating to pairing an accessory with the first apparatus and receiving, from a second apparatus, an indication the second apparatus is using the accessory. Phase 720 receiving from the first apparatus a notification of an event relating to the first apparatus. Finally, phase 730 comprises notifying the second apparatus, the accessory, or a combination thereof of the event.

Figure 8:
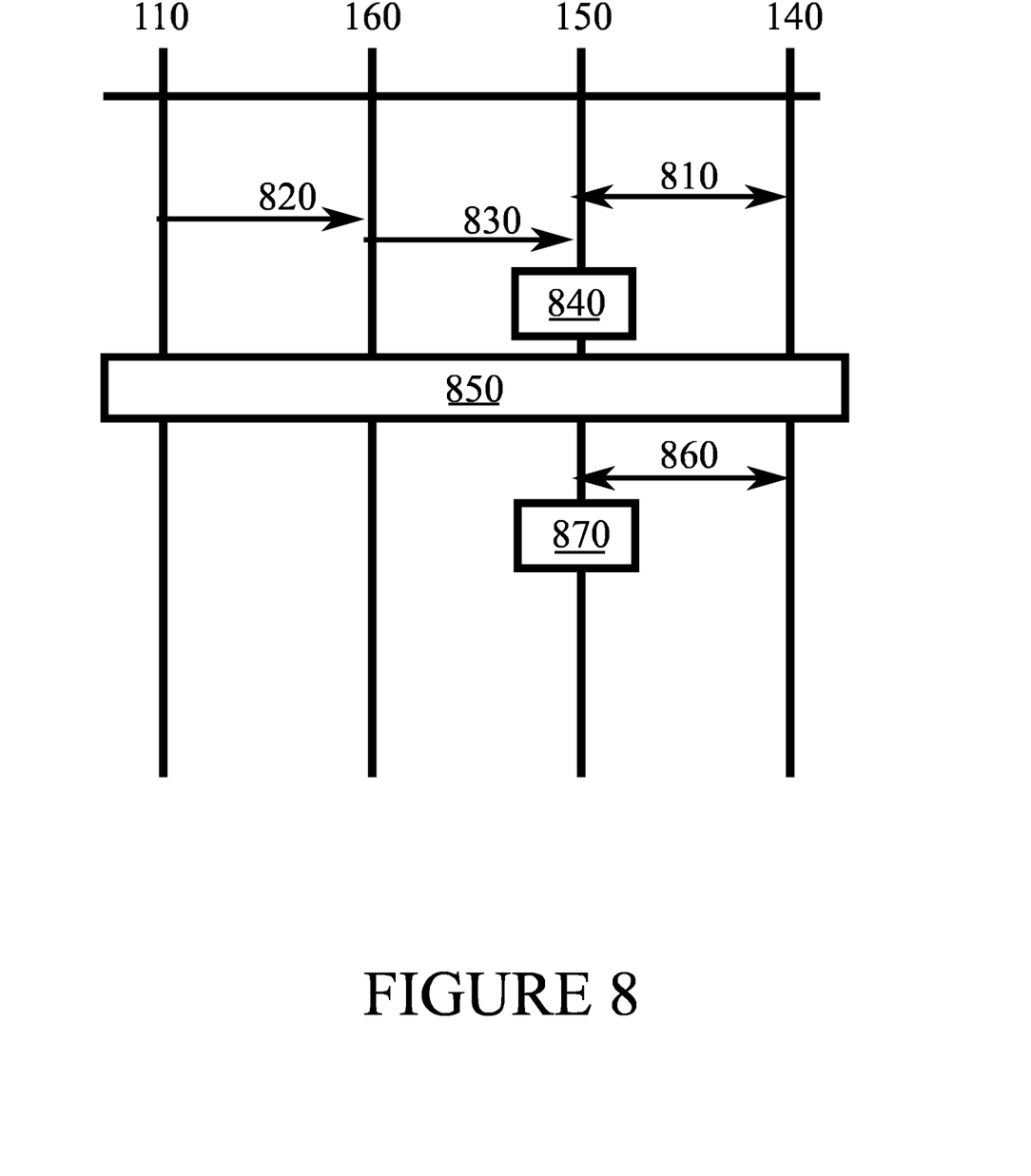
FIG. 8 illustrates signalling in accordance with at least some embodiments.

FIG. 8 illustrates signalling in accordance with at least some embodiments. On the vertical axes are disposed on the left, device 110, in the centre, storage entity 160 and unit 150, and on the right, accessory 140, each of FIG. 1. Time advances from the top toward the bottom.

Phase 810 illustrates an ongoing media stream, for example a music stream, from unit to accessory 140. Phase 820 is a notification from device 110 concerning an incoming call as described herein above. Storage entity 160 notifies unit 150 concerning the call in phase 830, responsive to which unit 150 queries from the user 840, whether he will accept or reject the call. In the illustrated example the user accepts the call, responsive to which the music may be paused, for example, and a redirection process 850 may be performed. The user may participate in the call via accessory 140 in phase 850. The redirection process may comprise conveying content of the call via a packet-based connection between device 110 and accessory 140, for example. Thus unit 150 provides contents of the incoming call to the user via accessory 140, the contents being routed to the apparatus from device 110.

Once the call ends, the redirected connection of phase 850 may be disconnected, after which a connection 860, similar to connection 810, is built, or resumed, between unit 150 and accessory 140. The media session of phase 810 is continued in phase 870.

While an incoming call is used as an example of an event in connection with FIG. 8, other kinds of events are also applicable.

Figure 9:
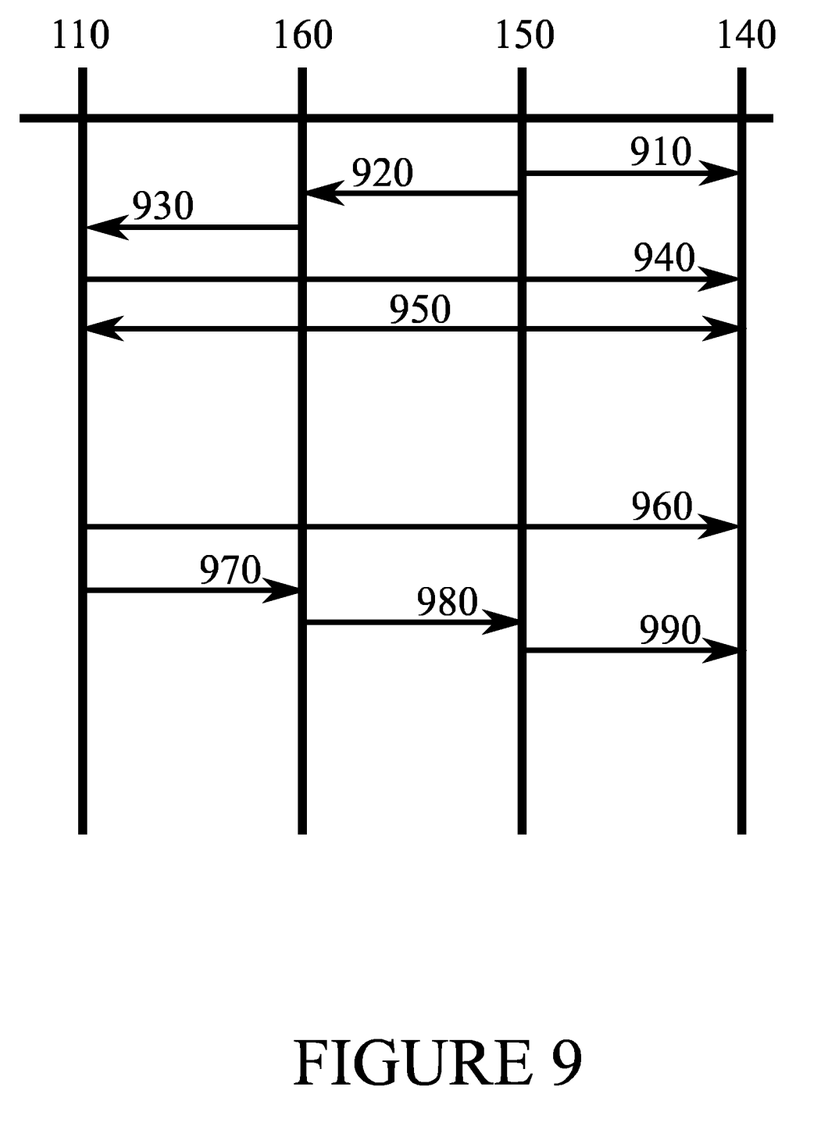
FIG. 9 illustrates signalling in accordance with at least some embodiments

FIG. 9 illustrates signalling in accordance with at least some embodiments. On the vertical axes are disposed on the left, device 110, in the centre, storage entity 160 and unit 150, and on the right, accessory 140, each of FIG. 1. Time advances from the top toward the bottom. The signalling of FIG. 8 relates to connection redirection, as was used in the process of FIG. 8, for example. Phase 910 comprises a disconnect, for example relating to the media session of phase 810 of FIG. 8. Phases 920 and 930 may comprise a notification of the disconnection being relayed to storage entity 160 and device 110, respectively.

Phase 940 may comprise a request to create a connection for the redirection, for example a packet-based connection, such as real-time transport protocol, RTP, or transmission control protocol, TCP, connection, for example. The connection is established in phase 950. Establishing the connection may comprise an end-to-end handshake and/or ciphering negotiation, for example.

Phase 960 comprises a notification of disconnection of the call, which may be conveyed over the connection of phase 950, for example. Storage entity 160 is notified of the disconnection on phase 970, and storage entity 160 may notify unit 150 of the disconnection in phase 980. Phase 980 may comprise a "140 disconnected" message, for example. The message of phase 990 may trigger re-establishment of a media session between unit 150 and accessory 140, for example.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in handling event notifications.

ACRONYMS LIST 5G fifth generation
BS base station
LTE long term evolution
NFC near field communication
NR new radio
RAT radio access technology
UE user equipment
WCDMA wideband code division multiple access
WiMAX worldwide interoperability for microwave access
WLAN wireless local area network

REFERENCE SIGNS LIST

| 110 | Device |
| 120 | Base station |
| 141 | Network node |
| 140 | Accessory |

-continued

| 150 | Unit |
| 160 | Storage entity |
| 170, 180 | Networks |
| 112 | Radio link |
| 111 | Carbon monoxide sensor |
| 114, 124, 147, 154, 167, 186, 158 | Connections |
| 201, 202 | Notifications |
| 210, 220, 230, 240, 250 | Characteristics of notifications |
| 300-370 | Structure of the apparatus of FIG. 3. |
| 410-480 | Phases of signaling in FIG. 4 |
| 510-520 | Phases of the method of FIG. 5 |
| 610-630 | Phases of the method of FIG. 6 |
| 710-730 | Phases of the method of FIG. 7 |
| 810-870 | Phases of signaling in FIG. 8 |
| 910-990 | Phases of signaling in FIG. 9 |

The invention claimed is:

1. An apparatus comprising at least one processing core and at least one memory including computer program code, the at least one memory and the computer program code being configured to, with the at least one processing core, cause the apparatus at least to:

provide, to a storage entity, information relating to use of an accessory with the apparatus to facilitate storage of the information and association of the information with a user account;

determine an event, comprising an event type from among a plurality of event types, and at least partly responsive to the event, determine the accessory is not currently in use with the apparatus when the event occurs; and notify the storage entity, wherein notifying the storage entity is configured to trigger the storage entity to convey an indication of the event to a second apparatus using the accessory and/or the accessory associated with the user account, and wherein the indication of the event comprises at least an audio clip that is associated with the event type of the event on the apparatus.

2. The apparatus according to claim 1, wherein the apparatus is further configured to determine whether the accessory is of a first type, and to notify the storage entity if the accessory is of the first type.

3. The apparatus according to claim 1, wherein the event comprises an incoming call and the accessory comprises at least one of the following: headphones, ear plugs and a virtual reality headset.

4. The apparatus according to claim 2, wherein the apparatus is further configured to query from the storage entity, whether the accessory or an another accessory is in use with the second apparatus, and to notify the storage entity if the accessory or the another accessory is in use with the second apparatus.

5. The apparatus according to claim 4, wherein the apparatus is further configured to, with the at least one processing core, notify the storage entity of at least one characteristic of the event.

6. The apparatus according to claim 5, wherein the storage entity receives information about the event of the second apparatus previously paired with the accessory.

7. The apparatus according to claim 1, wherein the apparatus further comprises a connection between the second apparatus and the accessory.

8. The apparatus according to claim 1, wherein the at least one memory and the computer program code are further configured to, with the at least one processing core, cause the apparatus to store the use of the accessory with the apparatus in connection with an account or a subscription of a user.

9. The apparatus according to claim 1, wherein the at least one memory and the computer program code are further configured to, with the at least one processing core, cause the apparatus to determine a need for a notification of the event based at least in part from user preferences configured in the apparatus or in the storage entity.

10. The apparatus according to claim 1, wherein the event comprises a communication event and/or an alarm.

11. The apparatus according to claim 1, wherein the event storage entity information is related to pairing of the accessory with the apparatus, and wherein the at least one memory and the computer program code are further configured to, with the at least one processing core, cause the apparatus to determine the accessory is not currently paired with the apparatus when the event occurs.

12. An apparatus comprising at least one processing core and at least one memory including computer program code, the at least one memory and the computer program code being configured to, with the at least one processing core, cause the apparatus at least to:
- notify a storage entity that the apparatus is using an accessory to facilitate storage of information pertaining to the use of the accessory with the apparatus and association of the information with a user account;
- receive from the storage entity an indication of an event, comprising an event type from among a plurality of event types, relating to a second apparatus associated with the user account which was previously used by the accessory but not in use with the accessory when the event occurs; and
- provide a sensory indication of the event via the apparatus using the accessory, the accessory, or a combination thereof, wherein the indication originates from the second apparatus, which was previously used by the accessory but is not currently in use with the accessory when the event occurs, and wherein the indication of the event comprises at least an audio clip that is associated with the event type of the event on the second apparatus.

13. The apparatus according to claim 12, wherein the at least one processing core causes the apparatus to further provide at least one characteristic of the event via the accessory.

14. The apparatus according to claim 13, wherein the event comprises an incoming call and the accessory comprises at least one of the following: headphones, ear plugs and a virtual reality headset.

15. The apparatus according to claim 12, wherein the at least one processing core causes the apparatus to further provide contents of the event via the accessory, the contents being routed to the apparatus from the second apparatus.

16. A method comprising:
- providing, to a storage entity, information relating to use of an accessory with an apparatus performing the method to facilitate storage of the information and association of the information with a user account;
- determining an event, comprising an event type from among a plurality of event types, and at least partly responsive to the event, determining the accessory is not currently in use with the apparatus when the event occurs; and
- notifying the storage entity, wherein notifying the storage entity is configured to trigger the storage entity to convey an indication of the event to a second apparatus using the accessory and/or the accessory associated with the user account, and wherein the indication of the event comprises at least an audio clip that is associated with the event type of the event on the apparatus.

17. The method according to claim 16, further comprising determining whether the accessory is of a first type, and notifying the storage entity if the accessory is of the first type.

18. The method according to claim 16, further comprising querying from the storage entity, whether the accessory or another accessory is in use with the second apparatus, and notifying the storage entity if the accessory or the another accessory is in use with the second apparatus.

19. The method according to claim 16, further comprising correlating the apparatus, the accessory and the second apparatus via the storage entity.

20. The method according to claim 16, further comprising storing in the storage entity a subscription or account.

21. The method according to claim 16, further comprising transmitting a notification from the apparatus and/or from the storage entity comprising information concerning the event.

* * * * *